May 13, 1969 P. H. WENDLAND 3,444,381

SILICON PHOTODIODE HAVING FOLDED ELECTRODE TO INCREASE LIGHT PATH LENGTH IN BODY OF DIODE

Filed May 22, 1967

Paul H. Wendland,
INVENTOR.
BY.
Neil J. Driscoll
ATTORNEY.

United States Patent Office 3,444,381

Patented May 13, 1969

3,444,381

SILICON PHOTODIODE HAVING FOLDED ELECTRODE TO INCREASE LIGHT PATH LENGTH IN BODY OF DIODE

Paul H. Wendland, Los Angeles, Calif., assignor to Hughes Aircraft Company, Culver City, Calif., a corporation of Delaware Filed May 22, 1967, Ser. No. 640,231
Int. Cl. H01j *39/12*
U.S. Cl. 250—211 9 Claims

ABSTRACT OF THE DISCLOSURE

The structure disclosed comprises a silicon photodiode useful to sense 1.06 micron radiation in an efficient and rapid manner.

Figure 1:
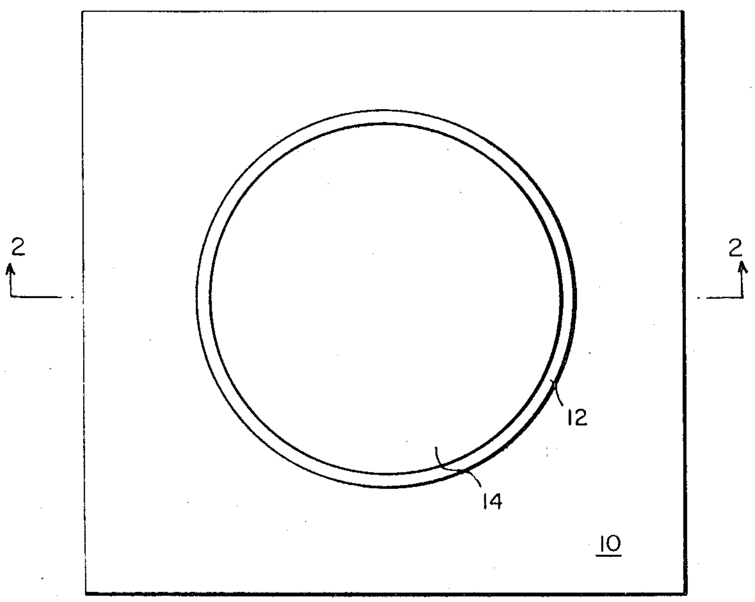

It is essentially a first electrode on one surface, a second electrode on the opposed surface with a readout device interconnecting the electrodes. The second electrode is deformed at the critical angle relative to the line of motion of incident radiation so that the radiation is totally internally reflected several times through the wafer. Fast and efficient response results.

The invention relates to a novel structural formation of a silicon photodiode having particular utility in the rapid and efficient detection of radiation in the near infrared spectral band.

As is well known, in the photoconducting process there results an increase in the number of current carriers available for the conduction process resulting from the absorption of radiant energy. Generically, radiant energy may be defined as the energy resulting from photons from ultraviolet, visible, and infrared regions of the spectral band. Historically, germanium surface barrier photocalls have been widely used and investigated. In recent years silicon surface barrier photocells have been intensively investigated and described in the literature in view of the fact that they generally provide one of the fastest and most sensitive solid state radiation detectors. See, for example, an article by E. Ahlstrom and W. W. Gartner entitled "Silicon Surface-Barrier Photocells," Journal of Applied Physics, vol. 33, No. 8, August 1962.

As a result of silicon photodiode detector development, the devices have been widely used in detection of both visible and near infrared radiation. As developed and currently used, they exhibit genarally a high quantum efficiency, for example, greater than 70%, as well as remarkably fast response time generally in the nanosecond range. The photodiodes currently available, however, have been defficient in the detection of radiation in the approximate 1.06 micron range, an area of the spectral band having increased utility as a result of the recent development of laser devices. For purposes of this disclosure the 1.06 micron radiation band will be generally referred to herein as laser radiation.

The noted deficiencies of prior art silicon photodiodes in the area of laser radiation have been found to be due to the physical characteristics thereof. As noted, the requirement for high speed, that is nanosecond response time, and high sensitivity, that is, in excess of 70%, are in the case of laser radiation, mutually exclusive. The absorption characteristics of silicon photodiodes dictates that a $10^{-1}$ centimeter path length is required to absorb 92% of normally incident lasing radiation. It has also been found, however, that if the electrode separation of the diode is greater than $10^{-2}$ centimeters, the carrier transit time is greater than 1 nanosecond. It will thus be apparent that if the diode is designed to meet the requirement of high sensitivity, the requirement for nanosecond response time is not met. Alternately, where the diode is made thin enough to achieve the desired rapid response time the absorption efficiency is substantially reduced.

With the above in mind, it is a primary object of the disclosed invention to provide a geometrical structure for a silicon photodiode which meets the requirements of high sensitivity and rapid response time.

It is yet a further object of the invention to provide a novel silicon photodiode structure having an optical path length such that highly efficient radiation absorption results, while the diode, per se, is thin enough to keep the carrier transit time in the nanosecond range.

It is a specific object of the invention to provide a novel photodiode structure having a radiation optical path length that may be extended to several milimeters while the total electrode separation within the diode is less than $10^{-2}$ centimeters.

Still another specific object of the invention is to provide a diode of the type described incorporating structure which will accommodate multiple internal reflection of incident radiation in the lasing spectral band.

While the above advantages have particular utility in the efficient and fast detection of radiation in the laser band it will be understood that the structure disclosed may well have utility in radiation detection in other than the 1.06 micron range.

Figure 2:
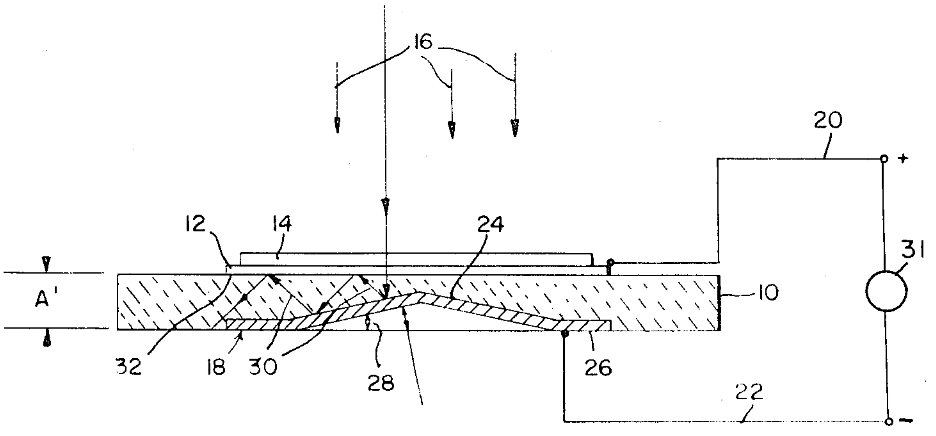

These and other advantages and features of the invention will be more clearly understood by reference to the following specification and the related drawing wherein:

FIGURE 1 is a plan view of a typical silicon photodiode incorporating the invention; and FIG. 2 is a side elevational view taken along line 2—2 of FIG. 1 with only the lower metallic electrode and silicon wafer body shown cross-hatched, the balance in elevation.

Describing the invention in detail and directing attention to the figures, a generally rectangular silicon wafer is indicated generally by the numeral 10. In a preferred embodiment of the invention, the wafer 10 has a generally uniform transverse thickness of approximately 4 mils as shown by the dimensiton A in FIG. 2. A transparent conductive electrode 12 is conventionally positioned on the upper surface of the wafer 10 and an anti-reflective film 14 is arranged to overlie the electrode 12. However, the anti-reflective film may be eliminated if desired. Incident radiation approaches the silicon wafer 10 at 90° to its upper surface as indicated by arrows 16, 16.

A junction electrode 18 may be provided at the lower surface of the wafer 10 and electrical leads 20 and 22 may be connected to the respective electrodes. In one operating embodiment the electrode 12 comprises a thin evaporated film of evaporated aluminum whereas the electrode 18 comprises an evaporated gold layer.

A presently preferred embodiment of the junction electrode 18 is provided with a rather unique configuration in that the electrode 18 and wafer 10 may be mechanically dimpled at a central segment 24 thereof so that the wafer 10 and junction electrode 18 form an annular planar ring 26 having the conical section 24 upraised therefrom. The angle of the segment 24 as indicated by arrow 28 is formed at about the critical angle relative to the index of refraction for the silicon wafer 10 and the material, metal, or the like, forming the junction electrode 18. The dimple may be conical, triangular, or other suitable configuration.

As is well known in the optical art, the critical angle is that angle of incidence at which radiant energy, approaching a transition interface surface between two materials having different indices of refraction, results in total internal reflection at that interface surface rather than the radiation passing through the interface surface and into the other material. For example, in silicon the critical angle is about 18°. Accordingly, critical angle 28 may be formed at 20°, for example, for satisfactory operation.

In operation, in the detector structure described, it will be seen that a beam of incident radiation as shown by arrows 16, 16 will pass through the anti-reflective film 14 and the transparent conductive electrode 12 and into the body of silicon photodiode wafer 10. At the interface surface of the conical segment 24 which is formed at the critical angle 28, the incident radiation is totally reflected as shown by arrowed lines 30, 30. The radiation, therefore, is so reflected back through the body of the silicon wafer 10 and approaches the interface surface 32 between transparent conductive electrode 12 and water 10 again at less than the critical angle. Here again, total internal reflection occurs and the radiant energy is returned toward the interface surface of the conical segment 24, again at less than the critical angle, and there again reflected internally of the wafer to the interface surface 32 for yet another reflective pass through the body of the wafer 10. The output of the diode, of course, may be monitored by any suitable device, such as ammeter 30.

It will be apparent that the optical path of the incident radiation passing through the body of wafer 10 has been greatly lengthened as compared to a simple direct through passage. The total path length easily exceeds the $10^{-1}$ centimeter path length required to achieve in excess of 90% of wafer absorption of the incident radiation. The increase in path length, however, does not result in increased electrode separation. For example, the physical separation of the conductive electrode 12 and the junction electrode 18 may be kept at a distance less than $10^{-2}$ centimeters and, accordingly, minority carrier transit time will be within the desired nanosecond range.

It will thus be apparent that a novel silicon photodiode structure is provided having particular utility in the fast and highly efficient detection of radiation in the lasing spectral band which avoids the difficulties heretofore present in current state-of-the-art detector structures.

The invention as disclosed is by way of illustration and not limitation and may be modified in many respects all within the spirit and scope thereof.

What is claimed is:

1. In a radiant energy detector, the combination of:
a thin wafer of radiant energy detection material,
a first electrode secured to the wafer,
a second electrode secured to the wafer and spaced from a first electrode,
and means to reflect internally of the wafer radiant energy entering the wafer to thereby lengthen the path length of the energy in the wafer and increase the absorption of said energy by the wafer.

2. A radiant energy detector according to claim 1, wherein said last-mentioned means comprises a first interface surface between the wafer material and another dissimilar material,
said interface surface being angularly arranged relative to the initial wafer penetrating the line of motion of said radiant energy.

3. A radiant energy detector according to claim 2, and including,
a second interface surface between the wafer material and a dissimilar material,
said second interface surface being operative to reflect internally of the wafer radiant energy received by reflection from the first interface surface.

4. A radiant energy detector according to claim 3, wherein,
said first interface surface is arranged at the critical angle relative to the initial wafer penetrating line of motion of said radiant energy.

5. A radiant energy detector according to claim 4, wherein,
said first interface surface is formed in the area of securement between the second electrode and the wafer,
said second interface surface being formed in the area of securement between the first electrode and the wafer.

6. A radiant energy detector according to claim 5, wherein,
said first interface surface is provided by dimple-deforming the second electrode and the adjacent surface of said wafer.

7. A radiant energy detector according to claim 6, wherein,
such dimple deformation is configured as a cone.

8. A radiant energy detector according to claim 7, wherein,
the first electrode is positioned on one side of said wafer and said second electrode is positioned on the opposite side of said wafer.

9. A radiant energy detector according to claim 8, and including,
an anti-reflective film arranged to overlie the first electrode,
said first electrode being transparent to the radiant energy.

References Cited

UNITED STATES PATENTS

| | | | |
|---|---|---|---|
| 3,232,795 | 2/1966 | Gillette et al. | 250—212 |
| 3,379,937 | 4/1968 | Shepherd | 317—235 |

RALPH G. NILSON, *Primary Examiner.*

MARTIN ABRAMSON, *Assistant Examiner.*

U.S. Cl. X.R.

250—83.3, 212